United States Patent [19]

Ponikwia et al.

[11] Patent Number: 4,674,690

[45] Date of Patent: * Jun. 23, 1987

[54] FEED TUBE PROTECTOR RETAINING APPARATUS

[75] Inventors: Edward F. Ponikwia, Dayton; William E. Dixon; Richard L. Stottmann, both of Troy, all of Ohio

[73] Assignee: Kitchenaid, Inc., St. Joseph, Mich.

[*] Notice: The portion of the term of this patent subsequent to Sep. 30, 2003 has been disclaimed.

[21] Appl. No.: 690,711

[22] Filed: Jan. 11, 1985

[51] Int. Cl.$^4$ .................................... B02C 18/16
[52] U.S. Cl. .................................... 241/37.5; 241/92; 241/282.1
[58] Field of Search ......... 16/257, 259, 266, DIG. 13; 241/36, 37.5, 92, 199.12, 282.1, 282.2, 285 R, 285 A, 285 B; 366/150, 349, 347; D7/378, 384

[56] References Cited

U.S. PATENT DOCUMENTS

| | | | |
|---|---|---|---|
| 4,216,917 | 8/1980 | Clare et al. | 241/37.5 |
| 4,226,373 | 10/1980 | Williams | 241/37.5 |
| 4,471,915 | 9/1984 | Levin et al. | 241/37.5 |

OTHER PUBLICATIONS

European Patent Appln. Publication No. 0 084 745, John Behringer, published Aug. 3, 1983, and an English translation thereof.

Instruction brochure for Sunbeam Food Processor.

Primary Examiner—Timothy V. Eley
Attorney, Agent, or Firm—Biebel, French & Nauman

[57] ABSTRACT

A protector for a feed tube of a food processor comprises a feed tube protector hingedly mounted to a bowl cover by means of elongated hinge members such that the feed tube protector can be pivotally moved between a closed position over the feed tube and an opened position retracted from the feed tube. The elongated hinge members can be squeezed and deformed toward one another to permit hinge pins on their outer surfaces to be inserted into hinge brackets on the bowl cover for removably mounting the protector. A finger is formed on the forward extremity of each of the elongated hinge members and a corresponding aperture is formed into the upper surface of the bowl cover for receiving the fingers when the protector is in the closed position to prevent removal of the feed tube protector from an operating food processor.

3 Claims, 4 Drawing Figures

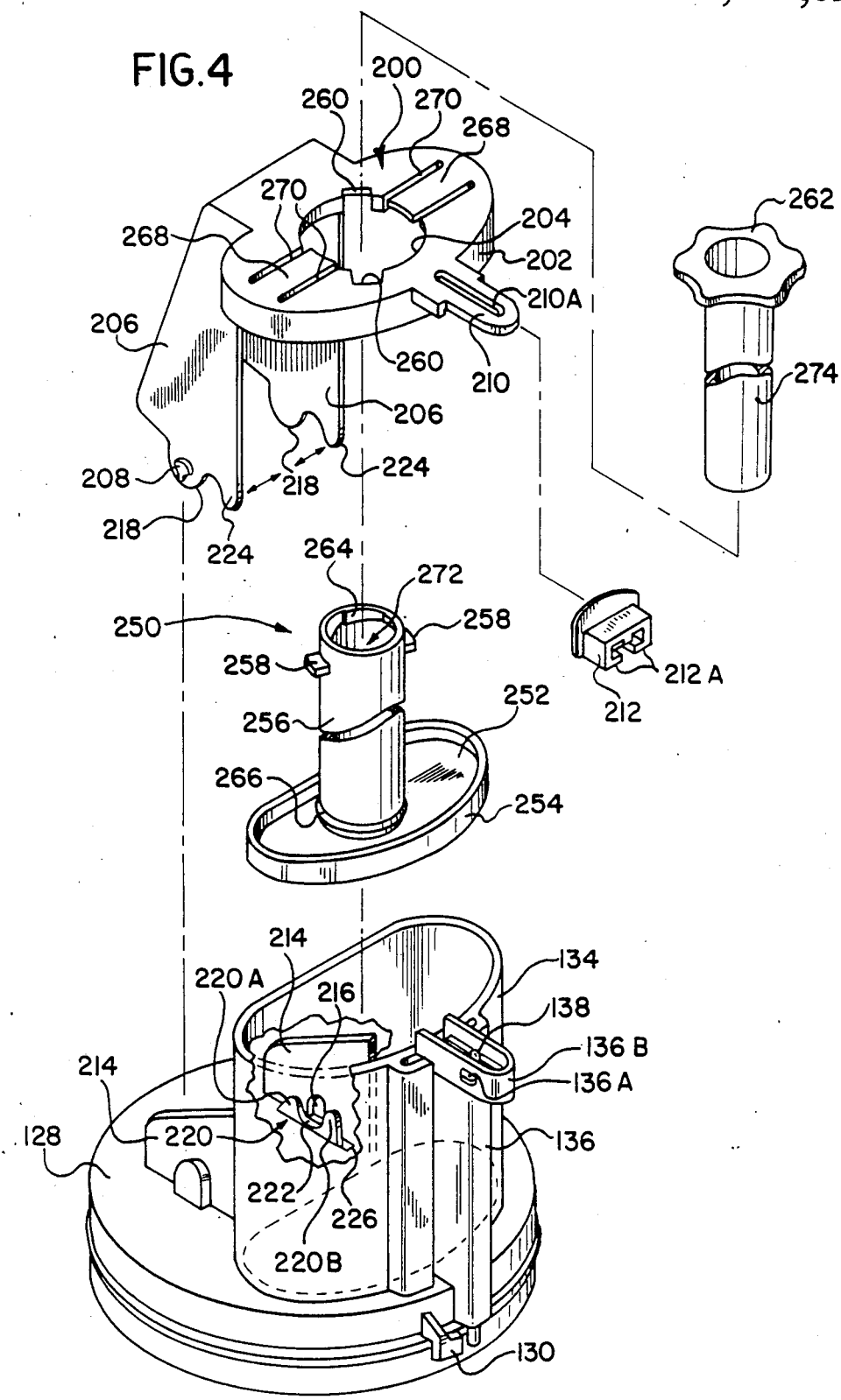

FEED TUBE PROTECTOR RETAINING APPARATUS

CROSS-REFERENCE TO RELATED APPLICATION

The present application is related to U.S. patent application Ser. No. 659,381 which was filed by Lawrence A. Doggett on Oct. 10, 1984, and is assigned to the same assignee as the present application.

BACKGROUND OF THE INVENTION

This invention relates generally to feed tube protectors for limiting the access to wide mouth feed tubes of food processors and, more particularly, to apparatus for preventing removal of hingedly mounted feed tube protectors during operation of the food processors.

Food processors are a well known convenience for preparing food by slicing, grating, shredding or similar food processing operations. A conventional form of food processor includes a working bowl having a motor driven shaft projecting upwardly in the center of the bowl. A variety of food processing tools are coupled to the shaft and rotated to perform a corresponding variety of food processing operations as required by the operator of the food processor.

A detachable bowl cover is secured to the working bowl during operation a feed tube for introducing food items to be processed through the bowl cover into the bowl. Foods to be processed are placed into the feed tube and then pushed through the tube into engagement with a processing tool by means of a food pusher which is formed to be slidingly inserted into the feed tube.

Frequently, feed tubes for food processors are relatively tall, narrow structures which prevent an adult from inadvertently inserting a normal hand through the feed tube and into contact with a rotating tool located in the upper portion of the working bowl. A safety interlock is provided to prevent the food processor from operating until the bowl cover is firmly secured to the bowl in its proper operating position.

The interlock is performed by a projection or cam formed on the bowl cover which causes the closing of a switch carried by the base of the food processor only when the bowl cover is properly secured to the bowl. Various designs provide for the operation of the switch directly or through intermediate mechanical linkages. Alternately, the switch may be magnetically activated by properly positioning and securing the bowl cover.

Unfortunately, the tall, narrow feed tubes also limit the size, shape and single load quantity of a food item which can be processed. To process larger sizes, larger single load quantities and variously shaped food items, for example, to slice relatively large size tomatoes or to lengthwise slice carrots, cucumbers or the like, enlarged feed tubes have been provided. Of course, safety considerations still apply and, hence, alternate safety or protection arrangements must be provided for such enlarged feed tubes.

One protector for an enlarged feed tube is disclosed in Williams, U.S. Pat. No. 4,226,373. The Williams feed tube protector comprises a sleeve which is sized and shaped to be slid over the feed tube of the food processor with the sleeve including an actuator for enabling motor operation only when the sleeve is properly positioned over the feed tube.

A telescoping food pusher which is sized to be received within the feed tube is captively connected to the sleeve such that the food pusher may be moved up and down within the feed tube, but may not be removed from the sleeve. In Williams, the captured food pusher blocks access through the enlarged feed tube when the sleeve is properly positioned over the feed tube to enable operation of the food processor.

Another approach to protection of an enlarged feed tube is disclosed by Behringer et al. in European Patent Publication No. 0084745. A cylindrical hopper nearly equal in diameter to the working bowl forms a combination bowl cover and enlarged feed tube, and is secured to the working bowl. The enlarged cylindrical feed tube includes a radially extending partition to prevent food from being circulated by the processing tool which is to work upon it. The enlarged cylindrical feed tube is closed by a feed tube cover which must be properly positioned over the feed tube before the food processor motor may be operated. An opening in the cover admits a food pusher including a pusher plate which is slotted to receive the partition.

While both Williams and Behringer et al. protect enlarged feed tube openings, the associated protection devices must be completely detached from the food processor and set aside while food to be processed is loaded into the enlarged feed tubes. The protection devices must then be replaced before the food processor can be operated. Removal and replacement of the protective devices is inconvenient and the protective devices, once removed, occupy counter space and may interface with activities associated with operation of the food processor. Further, since the protective devices are completely removed and set aside from the food processor, they may be temporarily mislaid leading to delays and frustration in use of the food processor.

SUMMARY OF THE INVENTION

The deficiencies of the prior art solutions for the protection of an enlarged feed tube for a food processor have been corrected by the disclosed feed tube protector which is hingedly connected to the bowl cover defining the feed tube. The improved feed tube protector may be pivoted to a closed position over the feed tube and may be pivoted away from the feed tube to a retracted position which permits free access to the feed tube opening by an operator of the food processor. The improved feed tube protector is thus readily available to be pivoted to the closed position for operation of the food processor. Since the improved feed tube protector is not removed from the food processor during food processing operations which require repeated fillings of the feed tube, there is no possibility that it can clutter an operator's work area or be mislaid.

The improved feed tube protector is generally applicable to food processors having a drive motor and control means for enabling the operation of the drive motor. In such food processors, a shaft coupled to the drive motor projects upwardly through the center of a working bowl for rotation of a food processing tool which, in turn, is coupled to the shaft and located within the upper or lower portion of the bowl. A bowl cover is detachably secured to the working bowl and defines an enlarged feed tube for introducing food items through the bowl cover into the bowl.

The improved feed tube protector is hingedly connected to the bowl cover for pivotal movement between a closed position over the feed tube and an opened position retracted from the feed tube. Two elongated hinge members which are separated from one another and formed from a resilient material serve as the hinged connection for the protector. Hinge pins extend from the outer surfaces of the hinge members and hinge brackets are formed on the bowl cover for receiving the hinge pins. To attach or detach the feed tube protector from the bowl cover, the elongated hinge members are squeezed such that they are deformed toward one another to permit the hinge pins to be inserted into the hinge brackets or to withdraw the hinge pins from the hinge brackets.

To prevent removal of the feed tube protector from an operating food processor which could potentially permit access to a rotating food processing blade, in accordance with the present invention the feed tube protector includes means for preventing the deformation of the elongated hinge members when the protector is in the closed position over the feed tube. In the preferred embodiment of the present invention, a finger is formed on the forward extremity of at least one of the elongated hinge members and at least one aperture is formed into the upper surface of the bowl cover for receiving the finger when the protector is in the closed position.

It is, therefore, an object of the present invention to provide an improved arrangement for preventing the removal of a hingedly mounted feed tube protector from an operating food processor when the protector is in a closed position over the feed tube of the food processor.

Other objects and advantages of the invention will be apparent from the following description, the accompanying drawings and the appended claims.

BRIEF DESCRIPTION OF THE DRAWINGS

FIG. 4 is an exploded perspective view of the bowl cover and the improved feed tube protector.

DETAILED DESCRIPTION OF THE INVENTION

Figure 1:
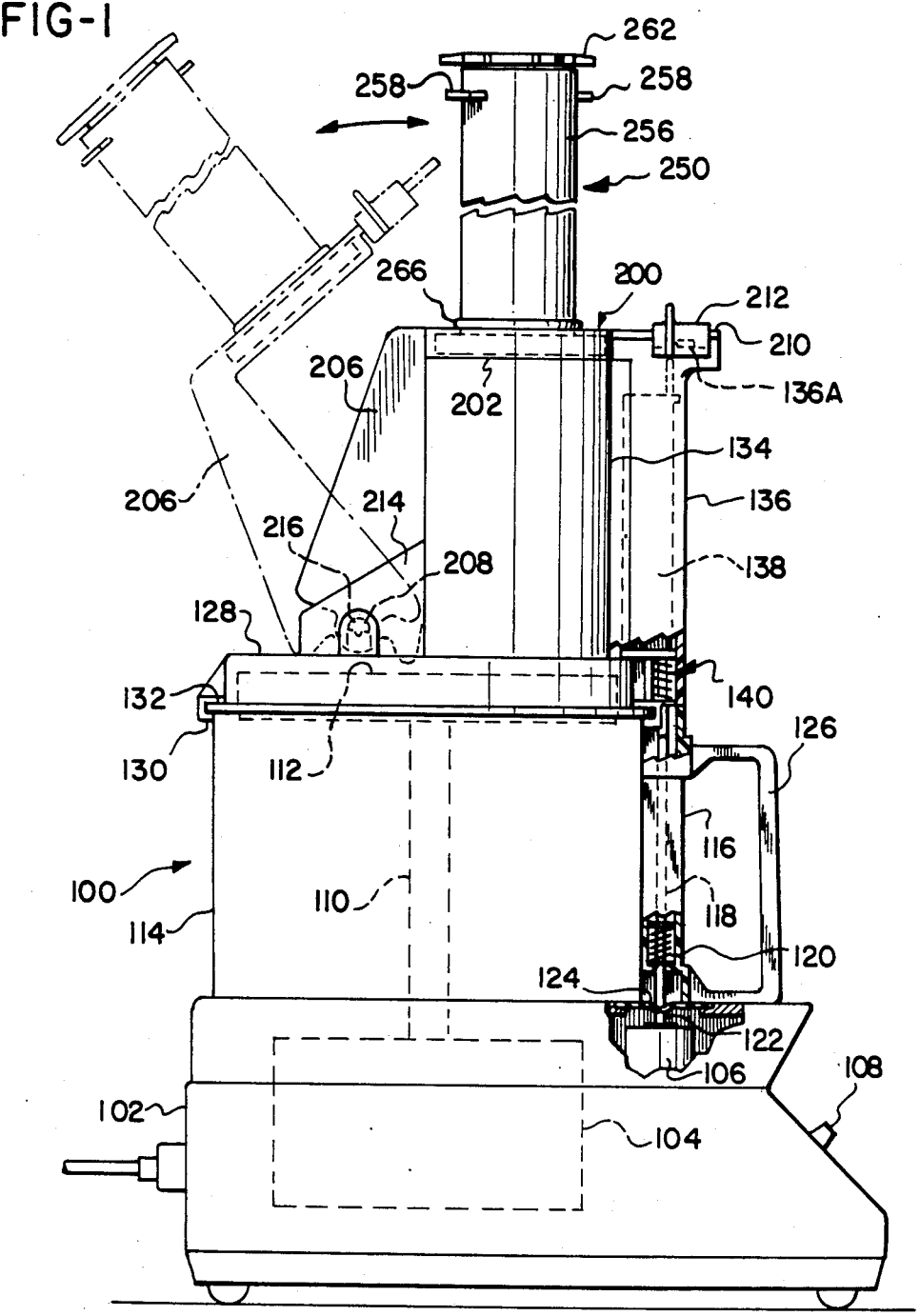
FIG. 1 is a side view of a food processor having an improved feed tube protector including the protector retaining apparatus of the present invention with portions broken away to show internal structure.

Referring to FIG. 1, a food processor 100 includes a base 102 for housing an electric drive motor 104 and control means for enabling the actuation of the drive motor 104. In the illustrated embodiment, the control means comprise an electrical interlock switch 106 and operator controls 108 which are enabled to control the drive motor 104 only when the interlock switch 106 is operated. A vertical drive shaft 110 extends upwardly from the base 102 and is driven by the motor 104 to rotate a cutting disk 112 or other interchangeable food processing tool within the upper portion of a working bowl 114. The bowl 114 is removably secured to the base 102 by one of a variety of means well known in the art.

A vertical channel 116 is formed on the side of the bowl 114 to receive a vertically movable interlock activating rod 118 which is normally forced to the upper end of the channel 116 by means of a spring 120. When the bowl 114 is properly positioned and secured to the base 102, the activating rod 118 is aligned with an actuating pin 122 of the interlock switch 106. To prevent contamination of the interlock switch 106 and the interior of the base 102, a resilient membrane 124 covers the switch actuating pin 122. A handle 126 is formed on the working bowl 114 adjacent to the channel 116.

The opening of the working bowl 114 is closed by a bowl cover 128 which is removably secured to the working bowl 114 by one of a variety of means well known in the art. For example, a twist lock arrangement may be used wherein two or more lugs 130 on the bowl cover 128 engage intermating ridges 132 formed around the upper edge of the working bowl 114. Formed into and extending upwardly from the bowl cover 128 is an enlarged feed tube 134 which forms a passageway through the bowl cover 128 for food items to be processed.

Figure 2:
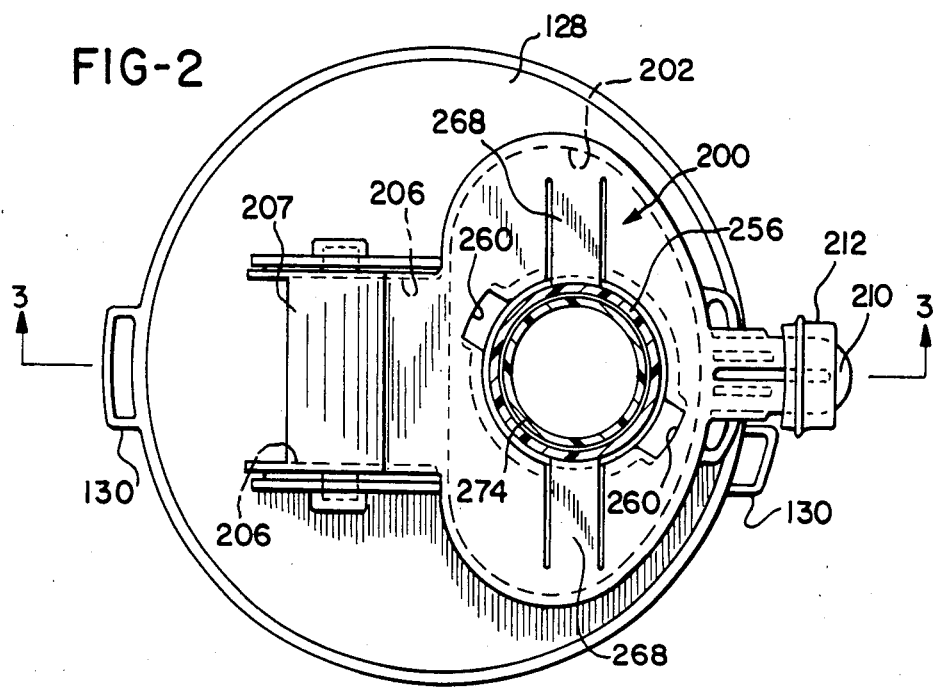
FIG. 2 is a plan view of the bowl cover and improved feed tube protector of the food processor of FIG. 1.

As best seen in FIGS. 2 and 4, the feed tube 134 is generally oblong in cross-section and extends from near the center of the cover 128 to near its periphery. The enlarged opening of the feed tube 134 requires a protector to prevent an adult from inserting a normal hand into the feed tube 134 and into engagement with the cutting disk 112 or other food processing tool while the food processor 100 is operating.

A vertical channel 136 extends along the feed tube 134 to house a second vertically moveable interlock activating rod 138 which is normally forced to the top of the channel 136 by means of a spring 140. It can be seen from FIG. 1 that, when the working bowl 114 is properly secured to the base 102 and the bowl cover 128 is properly secured to the working bowl 114, the actuating pin 122 of the switch 106, the interlock activating rod 118 within the channel 116 and the interlock activating rod 138 within the channel 136 are all vertically aligned with one another. To enable operation of the drive motor 104, the activating rod 138 is depressed against the resilient force of the spring 140 to in turn depress the activating rod 118 against the resilient force of the spring 120 to in turn depress the actuating pin 122 of the switch 106 to enable operation of the drive motor 104 by manipulating of the operator controls 108.

The improved feed tube protector comprises a feed tube cover 200 having a short skirt 202 depending therefrom around its periphery. The feed tube cover 200 is formed such that the depending skirt 202 abuts with the upper end of the feed tube 134 of the food processor 100 when the feed tube cover 200 is in the closed position over the feed tube 134. The feed tube cover 200 includes a central opening or aperture 204 which is sufficiently small to prevent an adult from inserting a normal hand into the feed tube 134 when the feed tube cover 200 is in the closed position over the feed tube 134.

Figure 3:
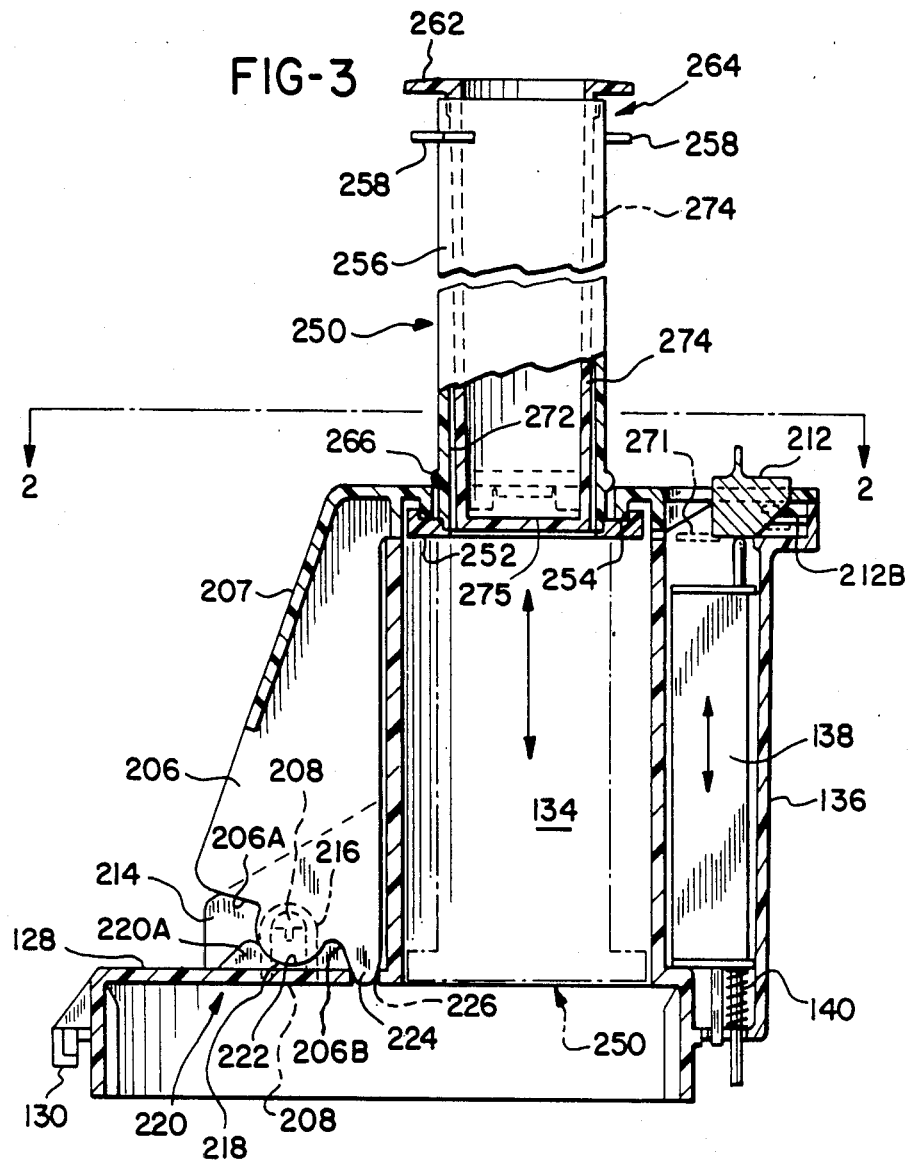
FIG. 3 is a partially sectioned side view of the bowl cover and improved feed tube protector taken along the section line 3—3 of FIG. 2.

Elongated hinge members 206 are interconnected by a web 207, see FIGS. 2 and 3, and extend downwardly from the feed tube cover 200. Hinge pins 208 extend from the outer surfaces of the elongated hinge members 206 near the lower ends of the elongated members 206. A tab 210 extends from the forward edge of the cover 200 for receiving a movable latching member 212 as will become apparent.

Hinge brackets 214 extend from the upper surface of the bowl cover 128 and include openings or keyway slots 216 formed on the inner sides thereof. The upper ends of the keyway slots 216 are rounded to conform to the upper surfaces of the hinge pins 208 of the elongated hinge members 206. The hinge members 206 are formed of a sufficient thickness of an appropriate plastic material such that they are somewhat resilient. The hinge members 206, hence, may be gripped by an operator's hand and squeezed together to deform the hinge members 206 toward one another such that the hinge pins 208 can then be engaged within or disengaged from the keyway slots 216 in the hinge brackets 214 to connect or disconnect, respectively, the feed tube cover 200 and the bowl cover 128.

To journal the feed tube cover 200 for hinged movement between a closed position over the feed tube 134, as shown in solid lines in FIG. 1, and a retracted position away from the feed tube 134, as shown in dash-dot lines in FIG. 1, the lower ends of the elongated hinge members 206 include rounded supporting surfaces 218. Feed tube cover support blocks 220, see FIGS. 3 and 4, are positioned on the inside surfaces of the hinge brackets 214 adjacent to the keyway slots 216 and define rounded bearing surfaces 222 for receiving the rounded supporting surfaces 218 of the elongated hinge members 206.

The feed tube cover support blocks 220 also define stops 220A and 220B which are engaged by corresponding surfaces 206A and 206B of the elongated hinge members 206 for defining the opened and closed positions of the feed tube cover 200, respectively. In accordance with the present invention, interference means are provided for preventing the deformation of the elongated hinge members 206 when the feed tube protector is in the closed or operating position over the feed tube 134 to thereby prevent removal of the feed tube protector during operation of the food processor. In the illustrative embodiment of the invention, the elongated hinge members 206 each include depending fingers 224 which engage mating holes 226 formed into the upper surface of the bowl cover 128 when the feed tube protector is in the closed or operating position. Alternate arrangements equivalent to that disclosed will be apparent to those skilled in the art. For example, extensions or fingers could be formed to engage openings in the base of the feed tube 134 or stops could be formed on the upper surface of the bowl cover 128.

A primary food pusher 250 is coupled to the feed tube cover 200 such that it is aligned with the feed tube 134 for reciprocating motion therein when the feed tube cover 200 is in its closed position over the feed tube 134. The food pusher 250 comprises a pusher plate 252 having an upwardly extending flange 254 and being sized to slidingly fit within the feed tube 134 for pushing food therethrough. A pusher shaft 256 is fixedly connected to the pusher plate 252 and is sized to be received through the centralized opening or aperture 204 in the feed tube cover 200.

To ensure that the pusher plate 252 does not engage the cutting disc 112 or other processing tool within the upper extremes of the working bowl 114, tabs 258 are formed to extend from the outer surface of the upper end of the pusher shaft 256. The tabs 258 are sized and positioned to be received within notches 260 formed in the edges of the central aperture 204 through the feed tube cover 200. While two tabs 258 and notches 260 are shown in the illustrative embodiment, any reasonable number of such tabs and notches can be used in the present invention.

The pusher shaft 256 must be rotated to a position where the pusher plate 252 is not aligned with the feed tube 134 for the tabs 258 to be aligned with the notches 260 such that the pusher shaft 256 can be inserted upwardly through the central aperture 204. The pusher shaft 256 is then rotated to align the pusher plate 252 with the feed tube 134 when the feed tube cover 200 is moved to the closed position over the feed tube 134. Thus positioned, the tabs 258 engage the upper surface of the feed tube cover 200 when the primary food pusher 250 is lowered into the feed tube 134 as shown by dash-dot lines in FIG. 3. In this way, the tabs 258 ensure that the pusher plate 252 is supported a slight distance above the cutter disc 112 or other food processing tool to prevent damage to the food processor.

A pusher head 262 which is larger than the central aperture 204 through the feed tube cover 200 is secured to the pusher shaft 256 on the upper side of the feed tube cover 200 for operation of the primary food pusher 250. Preferably, the pusher head 262 is removably secured to the pusher shaft 256 as shown in the illustrative embodiment to enable disassembly of the primary food pusher 250 from the feed tube cover 200 for cleaning purposes. Advantageously, the pusher head 262 may be secured to the food pusher shaft 256 by means of cammed surfaces 264 formed around the base of the pusher head 262 and the upper end of the pusher shaft 256. The cammed surfaces 264 permit the pusher head 262 to be secured to or freed from the pusher shaft 256 by relative twisting motions of a limited extent.

To facilitate pivotal movement of the feed tube cover 200 between the closed and opened positions, the feed tube cover 200 and primary food pusher 250 include support means for retaining the primary food pusher 250 in a raised position with the pusher plate 252 adjacent to the underside of the feed tube cover 200. The raised position of the primary food pusher 250 is shown in FIGS. 1 and 3.

The support means comprises projection means which, in the illustrative embodiment, form a concentric raised rib 266 in the outer surface of the pusher shaft 256. Retaining means for engaging the projection means form at least a portion of the centralized aperture 204 through the feed tube cover 200. In the illustrative embodiment, the retaining means comprise two opposed strips 268 of the feed tube cover defined by slots 270 which extend outwardly from the central aperture 204 through the feed tube cover 200. The retaining means or strips 268 are sized and of sufficient resiliency to retain the primary food pusher 250 in its raised position, yet permit the projection means or raised rib 266 to move past the retaining means upon application of a defined force on the primary food pusher 250.

Other support means may be utilized in the feed tube protector as will be apparent to those skilled in the art. For example, a tab or finger 271, as shown in FIG. 3, can be formed on the latching member 212 to extend beneath the pusher plate 252 when the latching member 212 is moved toward the feed tube 134.

In the preferred embodiment of the primary food pusher 250, the pusher shaft 256 is hollow and open at both ends with the opening through the pusher shaft 256 extending through the pusher plate 252 as shown in FIG. 3. The hollow pusher shaft 256 thus defines a reduced diameter secondary feed tube 272 through the food pusher 250 when the hollow pusher shaft 256 is coupled to the feed tube cover 200, in its lowered position and the pusher head 262 has been removed therefrom. In the illustrative embodiment, the pusher head 262 comprises a secondary shaft 274 which extends from the pusher head 262 and is sized to be slidingly received within the hollow pusher shaft 256.

The secondary shaft 274 of the pusher head 262 extends through the hollow pusher shaft 256 such that the closed lower end 275 of the secondary shaft 274 completes the food pushing surface of the pusher plate 252 as best seen in FIG. 3. In the preferred embodiment, the secondary shaft 274 of the pusher head 262 is inserted into the hollow pusher shaft 256 with the pusher head 262 being secured to the pusher shaft 256 by means of the cammed surfaces 264 to form the primary food pusher 250 which is reciprocated within the feed tube 134. When the pusher head 262 is loosened from the hollow food pusher shaft 256, the closed shaft 274 of the pusher head 262 may be withdrawn from the hollow pusher shaft 256 to access the secondary feed tube 272 and reinserted thereinto for use as a secondary food pusher.

The latching member 212 serves to secure the feed tube cover 200 in its closed position over the feed tube 134 by being pulled or slid toward the distal end of the tab 210. As the latching member 212 slides toward the end of the tab 210, flanges 212A engage extensions 136A on an enlarged upper portion 136B of the channel 136. As best seen in FIG. 3, a cam surface 212B depresses the interlock activating rod 138 which, in turn, depresses the interlock activating rod 118 to operate the switch 106 via the activating pin 122. The interlock activating rod 138 is held in its depressed position by the underside of the rib the forward edge of which defines the cam surface 212B. The latching member 212 is coupled to the tab 210 by means of thermally deforming the latching member 212 or otherwise, as will be apparent to those skilled in the art.

Operation of the food processor 100 with the improved feed tube protector will now be described. The primary food pusher 250 is initially assembled to the feed tube cover 200 by properly orienting the primary pusher shaft 256 such that the tabs 258 pass through the notches 260. The pusher shaft 256 is then reoriented such that the pusher plate 252 is aligned with the feed tube 134 when the feed tube cover 200 is hingedly connected to the bowl cover 128 and moved to its closed position over the feed tube 134.

The secondary shaft 274 of the pusher head 262 is then inserted into the hollow pusher shaft 256, i.e., the secondary feed tube 272, and the pusher head 262 is secured to the pusher shaft 256 by engagement of the cammed surfaces 264 to form the primary food pusher 250. The primary food pusher 250 is then moved to its raised position where it is secured by the rib 266 which is engaged by the strips 268.

The elongated members 206 are grasped by the hand of an operator and squeezed to deform the members 206 toward one another such that the hinge pins 208 can be fitted between the hinge brackets 214 and engaged within the keyway slots 216 formed therein. This positions the rounded supporting surfaces 218 of the elongated hinge members 206 within the rounded bearing surfaces 222 of the feed tube cover support blocks 220.

Once the feed tube cover 200 is thus mounted on the bowl cover 128, it may be hingedly moved between the opened position retracted from the feed tube 134, shown in dash-dot lines in FIG. 1, and the closed position over the feed tube 134, shown in solid lines in FIG. 1. In the opened or retracted position, the opening to the feed tube 134 is accessible for loading food to be processed by the food processor thereinto. After the feed tube 134 is filled with the food to be processed, the feed tube cover 200 is pivoted about the elongated hinge members 206 to the closed position over the feed tube 134. Once in the closed position, the fingers 224 engage the holes 226 to prevent deformation of the elongated hinge members 206 toward one another and thereby prevent removal of the feed tube protector from the food processor 100.

It is noted that the operator controls 108 and the feed tube 134 are positioned on one side of the food processor 100 while the feed tube cover 200 is pivoted to the opposite side of the food processor 100 for opening the feed tube 134. By moving the feed tube cover 200 away from the operator controls 108 and hence the operator of the food processor 100, the operator is afforded unrestricted access to the opening of the feed tube 134 which is conveniently positioned over the operator controls 108.

During pivotal movement of the feed tube cover 200, the primary food pusher 250 is retained in its raised position by means of the rib 266 which is hold above the feed tube cover 200 by the resilient strips 268. As previously described, in the raised position the food pusher 250 does not interfere with the pivotal movement of the feed tube cover 200.

Once moved into the closed position over the feed tube 134, the feed tube cover 200 is secured to the feed tube 134 of the bowl cover 128 by moving the latching member 212 to its forwardmost position on the tab 210 such that the flanges 212A engage the tabs 136A. The cam surface 212B depresses the interlock activating rods 138 and 118 which, in turn, operate the interlock switch 106 by means of the activating pin 122.

The food processor 100 can then be activated by operation of the operator controls 108 which have been enabled by operation of the interlock switch 106. Food which was previously loaded into the feed tube 134 is then forced through the feed tube 134 by the food pusher 250 into engagement with the cutting disc 112 or other food processing tool attaching to the drive shaft 110. The motor 104 is then deactivated by the operator of the food processor 100. The primary food pusher 150 is lifted to its raised position once more so that the feed tube cover 200 can be pivoted to the opened or retracted position for depositing additional food to be processed into the feed tube 134. Additional loads of food are then processed as just described.

If a narrower feed tube is adequate for food items to be processed, the secondary feed tube 272 may be utilized. For use of the secondary feed tube 272, the primary food pusher 250 is placed in its lowered position within the primary feed tube 134 such that the tabs 258 engage the upper surface of the feed tube cover 200. The pusher head 262 is then twisted relative to the pusher shaft 256 to disengage the cammed surfaces 264. The secondary shaft 274 of the pusher head 262 may then be removed from the secondary feed tube 272 defined by the hollow pusher shaft 256. Since the latching member 212 is still in its locked position, as shown in FIG. 3, the interlock switch 106 remains activated and the drive motor 104 can be operated by means of the operator controls 108.

Accordingly, with the pusher head 262 and secondary shaft 274 removed from the secondary feed tube 272, long narrow food products to be processed may be inserted thereinto. The food processor 100 can then be activated by means of the operator controls 108 and the long narrow food products inserted into the secondary feed tube 272 can be pushed therethrough by inserting the secondary shaft 274 into the secondary feed tube 272 wherein it functions as a secondary food pusher. Advantageously, the elements making up the improved feed tube protector may be disassembled as shown in the exploded view of FIG. 4 to facilitate cleaning of the food processor. Also, the parts of the feed tube cover are preferably made of a dishwasher-safe plastic to enable thorough dishwasher cleaning.

While the form of apparatus herein described constitutes a preferred embodiment of this invention, it is to be understood that the invention is not limited to this precise form of apparatus and that changes may be made therein without departing from the scope of the invention which is defined in the appended claims.

What is claimed is:

1. In a food processor having a drive motor and control means for enabling the operation of said drive motor; a working bowl having a shaft projecting upwardly therethrough, said shaft being coupled to said drive motor for rotation of a food processing tool coupled to said shaft within said bowl; a bowl cover detachably secured to said bowl and including a feed tube for introducing food items through said bowl cover into said bowl; a feed tube protector hingedly mounted to said bowl cover for pivotal movement between a closed position over said feed tube and an opened position retracted from said feed tube, said feed tube protector being mounted by means of two elongated hinge members separated from one another, formed from a resilient material and defining hinge pins on the outer surfaces thereof for engaging openings in hinge brackets formed on said bowl cover whereby said elongated hinge members can be squeezed to deform said hinge members toward one another such that said hinge pins can be engaged or disengaged from the openings in said hinge brackets to connect or disconnect said feed tube cover and said bowl cover; an apparatus for retaining said feed tube protector to said bowl cover when said protector is in said closed position comprising interference means for preventing the deformation of said elongated hinge members whereby said feed tube protector cannot be removed from said food processor when in said closed position over said feed tube.

2. An apparatus for retaining said feed tube protector to said bowl cover when said protector is in said closed position as claimed in claim 1 wherein said interference means comprises:
 a finger formed on at least one of said elongated hinge members; and
 at least one aperture formed into the upper surface of said bowl cover for receiving said finger when said feed tube cover is in said closed position such that said feed tube cover cannot be removed from said bowl cover when in said closed position.

3. An apparatus for retaining said feed tube protector to said bowl cover when said protector is in said closed position as claimed in claim 1 wherein said retaining apparatus is constructed to prevent disengagement of said hinge pins from their respective openings in said hinge brackets whenever said protector is overlying or substantially overlying said feed tube, but enables disengagement when said protector is retracted from said position overlying or substantially overlying said feed tube.

* * * * *

UNITED STATES PATENT AND TRADEMARK OFFICE
CERTIFICATE OF CORRECTION

PATENT NO.   : 4,674,690
DATED        : June 23, 1987
INVENTOR(S)  : Edward F. Ponikwia et al.

It is certified that error appears in the above-identified patent and that said Letters Patent is hereby corrected as shown below:

In the Abstract, line 2, "feed tube protector" should read --feed tube cover--; and, line 9, "bowl cover" should read --feed tube cover--.

Col. 1, line 28, after "operation" insert --of the food processor. The bowl cover defines--.

Col. 2, line 30, "interface" should read --interfere--.

Col. 4, line 42, "manipulating" should read --manipulation--.

Col. 8, line 19, "hold" should read --held--; line 38, "attaching" should read --attached--; and, line 40, "food pusher 150" should read --food pusher 250--.

Signed and Sealed this

Tenth Day of November, 1987

Attest:

DONALD J. QUIGG

Attesting Officer

Commissioner of Patents and Trademarks